US006959090B1

(12) United States Patent
Alve et al.

(10) Patent No.: US 6,959,090 B1
(45) Date of Patent: Oct. 25, 2005

(54) CONTENT PROTECTION SCHEME FOR A DIGITAL RECORDING DEVICE

(75) Inventors: Jukka Alve, Helsinki (FI); Jan Mårtensson, Ljungsbro (SE); Ola Lidholm, Motala (SE); Valtteri Niemi, Helsinki (FI); Juha Tomberg, Turku (FI); Pasi Kärkäs, Helsinki (FI); Harri Pekonen, Raisio (FI); Rami Suominen, Turku (FI)

(73) Assignee: Nokia Corporation, Espoo (FI)

( * ) Notice: Subject to any disclaimer, the term of this patent is extended or adjusted under 35 U.S.C. 154(b) by 925 days.

(21) Appl. No.: 09/718,024

(22) Filed: Nov. 20, 2000

(51) Int. Cl.⁷ .............................. H04L 9/00; H04L 9/32; G06F 12/14
(52) U.S. Cl. .................... 380/277; 705/51; 705/56; 713/160; 713/193; 380/210
(58) Field of Search .................... 705/51, 56; 713/160, 713/193, 760; 380/277, 210

(56) References Cited

U.S. PATENT DOCUMENTS

| | | | | |
|---|---|---|---|---|
| 5,513,260 A | * | 4/1996 | Ryan .......................... | 380/200 |
| 5,627,478 A | * | 5/1997 | Habersetzer et al. ........ | 324/763 |
| 5,636,278 A | * | 6/1997 | Lee .............................. | 380/210 |
| 5,754,651 A | * | 5/1998 | Blatter et al. ............... | 380/241 |
| 5,825,879 A | | 10/1998 | Davis ......................... | 380/216 |
| 5,852,290 A | * | 12/1998 | Chaney ...................... | 235/492 |
| 5,912,969 A | * | 6/1999 | Sasamoto et al. ............. | 705/57 |
| 5,963,646 A | * | 10/1999 | Fielder et al. .............. | 380/259 |
| 6,016,348 A | * | 1/2000 | Blatter et al. ............... | 380/228 |
| 6,105,136 A | * | 8/2000 | Cromer et al. .............. | 713/201 |
| 6,167,136 A | * | 12/2000 | Chou ........................ | 380/201 |
| 6,212,635 B1 | * | 4/2001 | Reardon ..................... | 713/165 |
| 6,714,650 B1 | * | 3/2004 | Maillard et al. ............ | 380/231 |
| 6,834,348 B1 | * | 12/2004 | Tagawa et al. ............. | 713/193 |

FOREIGN PATENT DOCUMENTS

| | | | |
|---|---|---|---|
| EP | 0 753 816 A1 | 6/1996 | ........... G06F 12/14 |
| EP | EP0814474 A1 | 12/1997 | ........... G11B 20/10 |
| EP | EP 0912052 A1 | 4/1999 | ........... H04N 5/913 |
| FR | 2732537 | 4/1996 | ........... H04N 7/16 |
| WO | WO 95/16238 | 6/1995 | ........... G06F 12/14 |
| WO | WO 99/57901 | 11/1999 | ........... H04N 7/16 |
| WO | WO 00/01149 | 1/2000 | ........... H04N 7/00 |

OTHER PUBLICATIONS

"Encryption of information to be recorded so as to prevent unauthorized playback", Research Disclosure, Kenneth Mason Publications, Hampshire, 6B, No. 335, Mar. 1, 1992, XP 000301128, pp. 219.

* cited by examiner

*Primary Examiner*—Gilberto Barrón, Jr
*Assistant Examiner*—Jung Kim
(74) *Attorney, Agent, or Firm*—Cohen, Pontani, Lieberman & Pavane

(57) ABSTRACT

A recording device for digital data streams, such as digital TV broadcasts or digitized music, stores copies of program content encrypted by a key unique to the recording device. Distribution of program content is thus discouraged, since intelligible playback of program content would not be obtained on another recording device, which would have a different key. To reduce manufacturing complexity which would result from requiring all bits of a key to inhere in hardware, a first portion of the key inheres in hardware and a second portion is selected from among several candidates residing in a memory device, the key being determined by combining the first and second portions according to predetermined rules. The second portion is reselected at predetermined intervals from among the candidates. Only payload portions of packets are encrypted while header portions are left in the clear in order to facilitate ancillary functions of recorder such as fast forward, fast rewind, and program search.

34 Claims, 5 Drawing Sheets

CONTENT PROTECTION SCHEME FOR A DIGITAL RECORDING DEVICE

BACKGROUND OF THE INVENTION

1. Field of the Invention

The present invention relates to recording devices for digital data streams, and particularly to methods and systems for restricting distribution of copies recorded on such devices.

2. Description of the Related Art

Digital recording technology makes it possible to easily reproduce exact copies of digital data streams such as audiovisual material, including movies, television programs, and audio recordings. Compression technologies, such as specified by the Motion Pictures Expert Group (MPEG), reduce the requirements for data storage space so that it is possible to store such recordings on a hard disk, such as the hard disk in a personal computer (PC). Once content is captured on a hard disk, it is simple to make large numbers of copies on writable compact disks (CD's) or DVD disks, for example, or to distribute the content to others over network connections, such as over the Internet.

Such copying capability poses the threat that illegal copying can become widespread, causing significant economic losses to the owners of proprietary rights to the content. There is thus a need to protect recorded content from illicit reproduction and distribution, i.e., copyright infringement.

SUMMARY OF THE INVENTION

In accordance with the present invention, digitally recorded content is protected by encrypting the data prior to recording it on a hard disk using a standard encryption method with an encryption key that varies from one digital recorder unit to another. When the data is played back, it is decrypted with the same key. An attempt to play back the encrypted file on another digital player or recorder unit will produce no intelligible output.

Manufacturing a number of recorders, each with a unique key completely hard-wired, is labor intensive and thus expensive. In the present invention, the key is formed by combining a relatively small portion hard-wired in the recorder and a large portion stored in a memory associated with the recorder and retrievable under control of software.

In an alternative embodiment a sub-portion of the large portion is entered by a user. This enables the user to preclude other users of the same recorder who do not know the sub-portion from playing back certain program content.

An aspect of the invention provides a one-time-programmable device for storing the encryption key, a first security bit, and a second security bit. A readout path is provided to retrieve the encryption key for purposes of testing after manufacture. When testing is complete, the first security bit is programmed ON (an irrevocable procedure). The readout path is arranged to be disabled by the ON condition of the first security bit. The readout path is further arranged to be re-enabled by programming ON the second security bit (also an irrevocable procedure); however another path essential to functioning of the recorder is arranged to be disabled by the ON condition of the second security bit. Retrieval of the key to program it into a second recorder to replace the first one if the first one has broken down is thus possible, but retrieval of the key for illicit purposes is thus discouraged.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
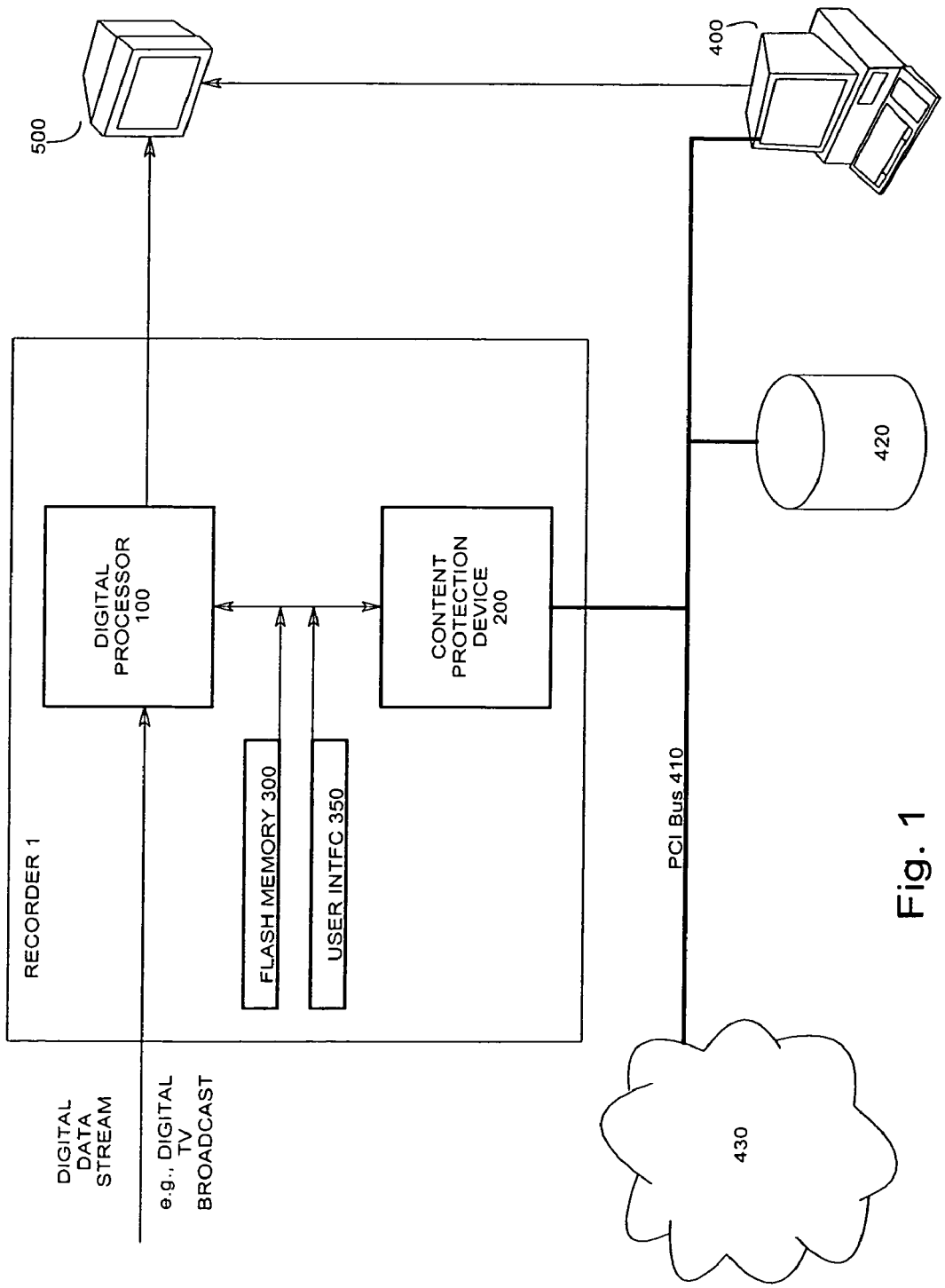
FIG. 1 is a high-level block diagram of a system including a recorder embodying the present invention.

FIG. 1 is a high-level block diagram of a system embodying the present invention. Recorder 1 includes digital processor 100 which receives a digital data stream, which for purposes of the present example is a digital television broadcast, but which might be digitized audio, digitized video such as a movie or portion thereof, digitized information, etc. Transmission of the digital data stream to digital processor 100 may be by means of radio-frequency transmission, cable, or the like. Digital processor 100 processes the digital data stream into a form intelligible to a user; in the present example a digital TV broadcast is presented on TV monitor 500.

The user of recorder 1 may direct that the digital data stream be recorded for later use. Such recording may be on video cassette or rewritable compact disc (CD/R). Use of compression techniques such as MPEG-2 (a standard established by the Motion Pictures Expert Group) enables recording on a hard disk drive. In a present embodiment, recorder 1 is associated with a personal computer (PC) 400, with which a hard drive 420 is associated; is Recorder 1 communicates with PC 400 via PCI bus 410 (so named because it conforms to the Peripheral Component Interconnect bus standard) and through PC 400 recorder 1 communicates with hard drive 420. In an alternative embodiment, recorder 1 is a self-contained set-top box relative to TV monitor 500, in which case storage 420 and PC 400 are located in box housing recorder 1. Other embodiments may be contemplated that do not include a personal computer. Such other embodiments would still have a storage device, such as hard drive 420.

Once program content is recorded on the storage device, copies of the content could then be distributed easily in the manner of transferring any PC files, such as making and distributing multiple copies on multiple CD's, or distributing copies over the Internet 430. Since such distribution would be detrimental to owners of copyright in the content, the present invention stores encrypted copies in a manner adapted to limit such distribution.

Recorder 1 includes content protection device (CPD) 200 interposed between digital processor 100 and storage device 420 to perform the encryption and decryption. In a preferred embodiment, CPD 200 is a digital integrated circuit (ASIC). In a preferred embodiment, CPD 200 encrypts using the 3DES (data encryption standard) algorithm, with a 168-bit key. CPD 200 of any particular recorder 1 uses a particular key different from that used in other recorders 1. Thus, a copy given to the owner of another recorder 1 would not play back intelligibly on the other recorder 1.

Manufacturing such ASICs with unique on-chip 168-bit keys can be difficult and expensive. A preferred embodiment employs an alternative solution of using an externally applied unique or pseudo-unique key portion that can be stored in non-volatile memory such as FLASH memory 300, and an internal key portion "on chip" inside the said CPD 200. In a is preferred embodiment the internal key portion is in a one-time-programmable ROM within CPD 200. In an alternative embodiment the internal key portion is encoded in bonding wires bonded during manufacture of the ASIC embodying CPD 200. The actual key used when encrypting and decrypting data is constructed as a combination of the external key and the internal key. The external key can be changed from time to time by software, for instance after each movie recorded. Key management software, running in digital processor 100, can maintain a table of the keys used in the FLASH memory, so that only indexes to the table need be passed to the CPD 200 to be attached to the file that contains the recording. The external keys can be made unique for each unit, for example, by using the serial number of the unit as a seed for a key generation algorithm. Pseudo-unique keys can be generated by using a random number as the seed. Noise received by a satellite, cable, or terrestrial front-end that is not tuned to a proper channel can be used as a source for the random numbers. Variations to the internal key can be made during packaging of the integrated circuit through, for example, the use of different patterns for bonding wires inside the device. This design makes it possible to manufacture small batches of devices with different internal keys for a lower cost, relative to manufacturing devices with the entire key being unique.

At user direction, a sub-portion of the external key portion may be provided through user interface 350. Using this feature, a user may restrict other users of the same recorder 1 from accessing certain program content. For example, a parent may provide a key sub-portion when recording material inappropriate for children, so that his minor children are then unable to view that material because they do not know the sub-portion of the key.

Figure 2:
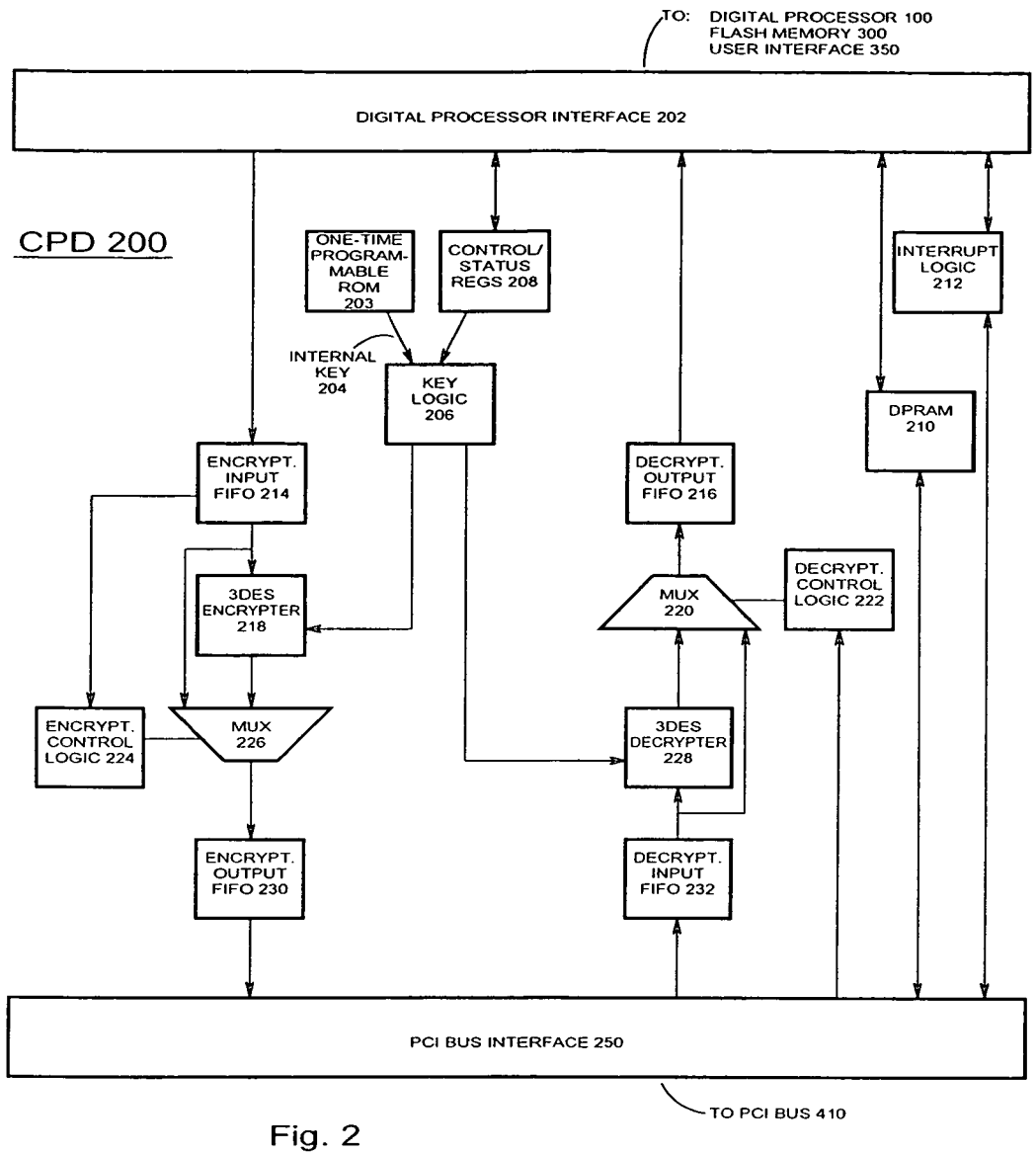
FIG. 2 shows further detail of a content protection device shown in the recorder of FIG. 1.

FIG. 2 is a block diagram showing internal detail of CPD 200. (CPD 200 includes software-controlled logic (not shown) for effecting intercommunication among CPD 200's various components.) Digital processor interface 202 maintains two-way communication between CPD 200 and digital processor 100, as well as with flash memory 300 and user interface 350. Dual-port random-access memory (DPRAM) 210 stores data being transferred into or out of CPD 200, and is heavily used to transfer software-generated control messages between digital processor 100 and PC 400. Interrupt logic 212 passes interrupt signals between digital processor 100 and PC 400. A major use of such interrupt signals is to alert PC 400 to the availability of encrypted data during recording, and to the need for more data retrieval during playback. Control and status registers 208 store control information and transfer control information, such as key components, into and out of CPD 200. Internal key 204 represents the 8-bit portion of the 168-bit 3DES key used for encryption and decryption. Key logic 206 combines the 160-bit external key portion obtained from flash memory 300 (or alternatively, from flash memory 300 in conjunction with user interface 350) with the 8-bit internal key 204 to produce, according to a predetermined relationship, the 168-bit 3DES key.

A current portion of a digital data stream (such as program content of a digitized TV broadcast) sent from digital processor 100 for storage on hard drive 420 is input to encrypter input FIFO 214, from which the payload portion is input to 3DES encrypter 218, along with an encryption key from key logic 206. Packet headers bypass encrypter 218 under control of encryption control logic 224 and are passed by multiplexer 226 along with the encrypted payload portion of the data stream. The resultant stream is stored in encrypter output FIFO 230 for subsequent output through PCI interface 250 to PCI bus 410 for transfer to hard drive 420. Keeping the header portions unencrypted facilitates such functions as fast forward and fast rewind.

A data stream retrieved from hard drive 420 is passed over PCI bus 410 and through PCI interface 250 into decrypter input FIFO 232. It is input to 3DES decrypter 228 along with a decryption key from key logic 206. The encrypted payload portion, combined with unencrypted packet headers, are combined by multiplexer 220 under control of decryption control logic 222, and the resultant data stream is input to decrypter output FIFO 216 for transmission through digital processor interface 202 to digital processor 100 for further transmission, such as to TV monitor 500.

The encryption is performed on 188-byte MPEG-2 Transport Packets in such a fashion that the 4-byte packet headers are kept unencrypted, while the remaining 184 bytes of the packet (often referred to as the payload) are encrypted. This provides the possibility to demultiplex the encrypted content into video and audio packets, for instance, according to the packet ID (PID) in the header, without having to perform decryption. It will also be possible to scan the file back and forth (fast forward and fast rewind) without sending unnecessary information through the decrypter to the video and audio decoders in digital processor 100, as it is possible to find the boundaries of packetized elementary stream (PES) packets according to the Payload Unit Start Indicator bit in the header. Audio packets can be skipped altogether in these modes. The encryption device performs a check for the packet length, and alerts the software controlling CPD 200 by an interrupt if an attempt is made to transfer packets that deviate from the standard 188 bytes.

Figure 3:
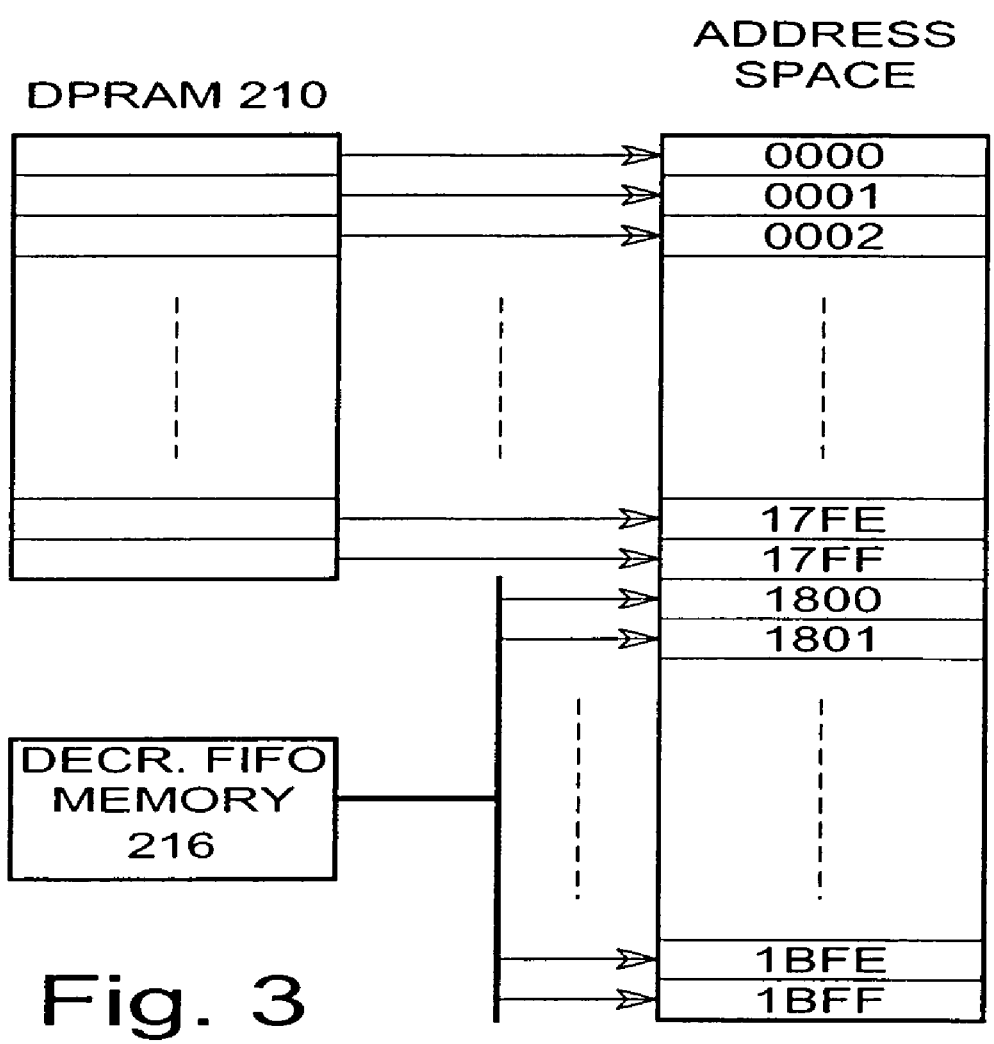
FIG. 3 depicts a memory address allocation scheme employed to enhance features of the present invention.

A feature of the preferred embodiment facilitates replacing packet headers during retrieval of a stored data stream. As shown in FIG. 3, the output of encrypter output FIFO 216 (serial bytes) is mapped to occupy a plurality of addresses in address space, and that plurality of addresses is contiguous with the addresses of DPRAM 210. A packet is written to encrypter output FIFO 216 as usual. The header is read out by software, and a replacement header is written to top locations of DPRAM 210. A DMA transfer is initiated, spanning from the replacement header in the DPRAM 210 through the address range representing the number of payload positions to be read out of the FIFO 216. Synchronizing the advancing of the payload stream from FIFO 216 with reading out of the designated address range causes the replacement header and the remaining part of the packet to be transferred to its destination in one DMA operation.

The invention solves the problem of illegal copying and distribution of digital media content, while still allowing the user to make a recording for his or her own, local use by encrypting the recording with a key unique to the particular recording device, obviating playback on other devices which would have different keys.

The combination of using external and internal keys allows flexibility in key management. The external key can be changed by software from time to time, e.g., after each movie recorded. An external key alone would provide only a limited amount of security, because it would be possible for a person trying to circumvent the content protection scheme to observe the external key on the bus through which it is loaded to the encryption/decryption device, and then decrypt the content of the hard disk, for instance by running DES or 3DES decryption software. In order to discourage people from distributing the content in the encrypted form along with the external key(s), the internal key varies from one recorder 1 to another, making it hard to is find another decryption device that can decrypt the content.

Keeping the transport packet headers unencrypted is an essential feature that allows easy implementation of trick modes such as fast forward and fast rewind. If the entire packets were encrypted it would be necessary to perform decryption for all the data that is skipped during playback, too.

The packet header and payload length security checks prevent abuse of the above described feature.

The packet header replacement feature, using a single DMA spanning from DPRAM to FIFO, is faster than copying the entire packet into memory, performing the replacement there, and then using DMA to transfer the packet with the replaced header to the audio decoder. This invention solves a problem that is specific to the audio decoder solution used, which dictates that DMA must be used to place data to the audio decoder's input buffer.

The encryption protection provided by the present invention, however, might work against the rightful owner of the copies in the event that his recorder 1 breaks down. If he obtains another recorder 1 it will have a different internal key 204, so he will not be able to play his recorded copies on it. A procedure for recovering the internal key 204 so that it can be programmed into another recorder 1 is possible, but is subject to abuse. Such a scheme is found in FIG. 4, which shows further detail of one-time programmable ROM 203 (introduced in FIG. 2) and the path from it to key logic 206. One-time programmable ROM 203 has at least eight bits, OTP1 through OTP8. Each of these eight bits is input to one of the eight AND gates 604, shown schematically as a single gate with the legend "x8". The gates are provided on the ASIC that comprises CPD 200. A signal directing that the internal key be passed to key logic 206 is provided at the other input of each of the eight AND gates 604, and the eight-bit key is passed through to key logic 206. As noted above in connection with FIG. 2, key logic 206 passes the key and/or derivative information to encrypter 218 and decrypter 228.

In a preferred embodiment, there is also provision for connecting an external IC tester 700. The tester may provide on line 710 a signal requesting the internal key, which is applied to an input of each of eight AND gates 602, each of which has its other input connected to a different bit of internal key 204. Internal key 204 is passed to the tester on lines 720, and the tester may then determine that one-time programmable ROM 203 was programmed correctly as intended. The connections 710 and 720 could be used by a device other than tester 700 for requesting and obtaining internal key 204, and thus could be used by a device to retrieve internal key 204 which could then be programmed into another recorder 1 for use by a rightful owner whose original recorder 1 has broken down. However, that facility could also be used by a pirate wanting to gain illicit access to the copies on hard drive 420 for playback on a different recorder 1.

Figure 4:
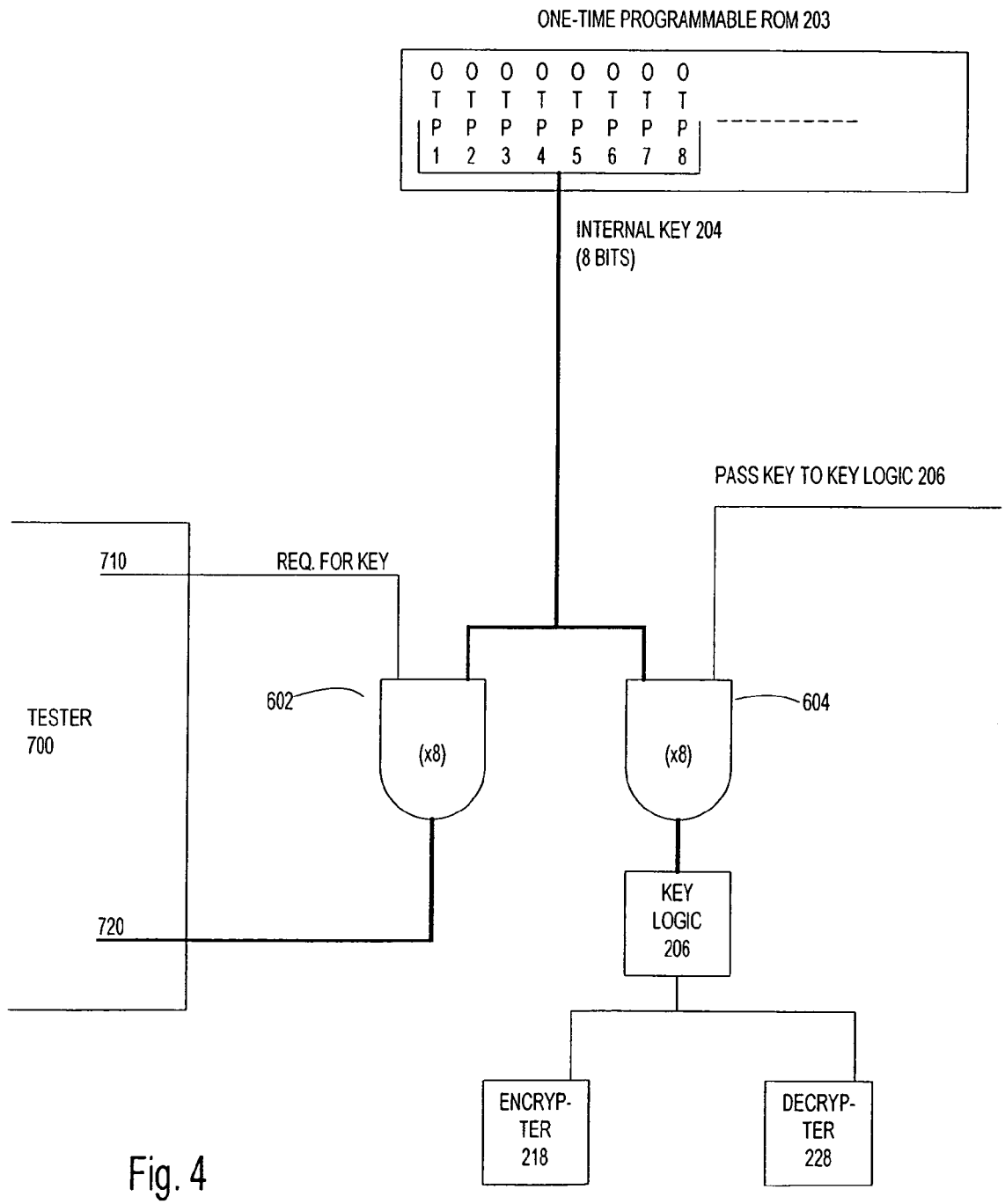
FIG. 4 depicts a basic scheme for recovering an internal key from the content protection device shown in FIG. 2.
Figure 5:
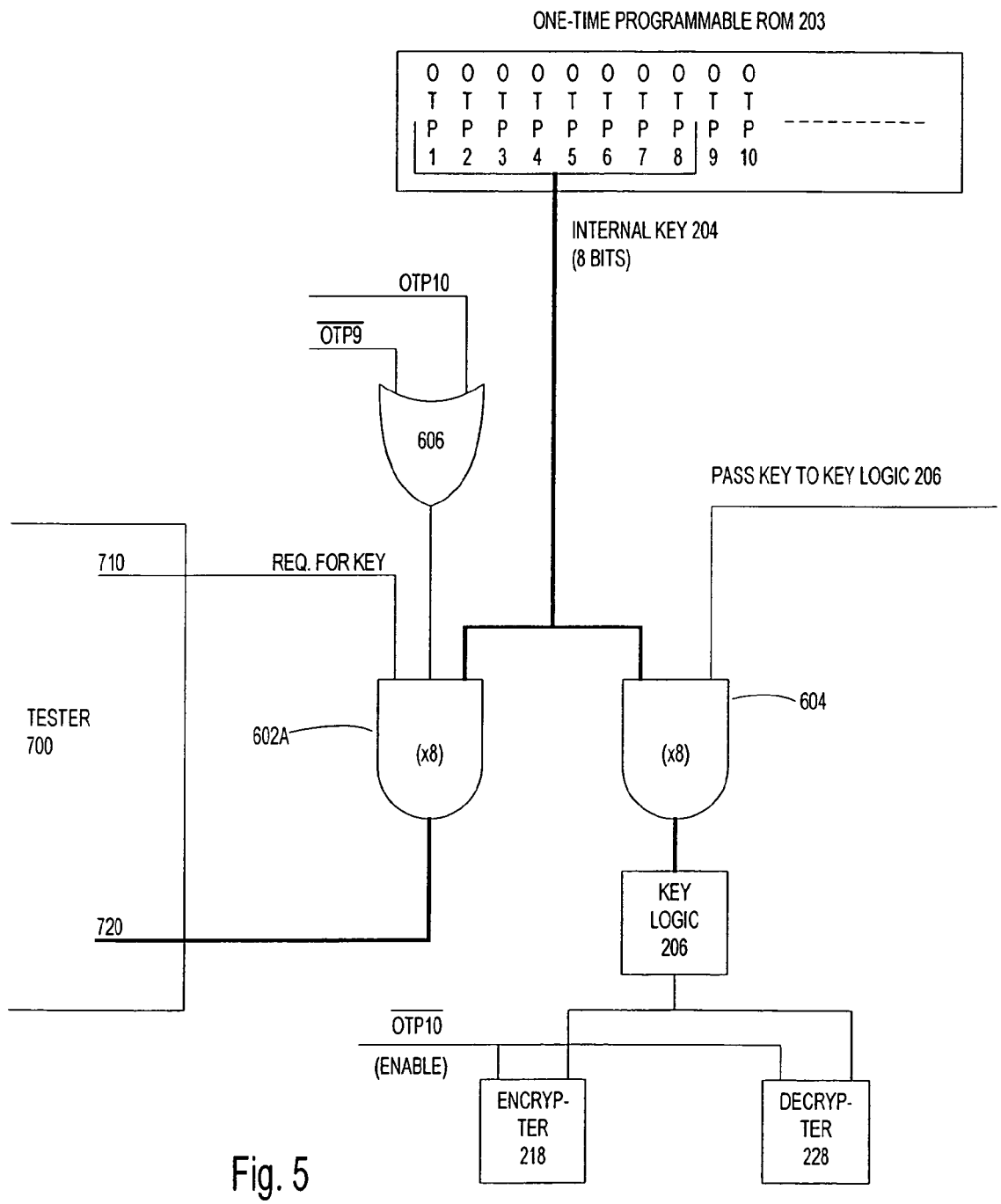
FIG. 5 depicts a scheme according to the present invention for recovering an internal key from the content protection device shown in FIG. 2.

FIG. 5 shows another embodiment using two additional bits available from one-time programmable ROM 203, namely OTP9 and OTP10. The AND gates corresponding to 602 of FIG. 4 are here provided with an additional input each, and are named 602A. OR gate 606 is introduced in FIG. 5. During initial manufacture of a recorder 1, an internal key 204 is programmed into bits OTP1 through OTP8. OTP9 and OTP10 are not programmed to values of 1, and thus contain values of 0. The 0 state of OTP9 conditions OR gate 606 to enable an input of AND gates 602A, which can then function as described in connection with FIG. 4 to pass internal key 204 to tester 700 on lines 720.

When testing of CPD 200 is complete, bit OTP9 is programmed to a value of 1. OR gate 206 is then not conditioned, and AND gates 602A thus can not be enabled to pass the internal key out on lines 720. Anyone wishing to access the copies on hard drive 420 is thwarted. There is no effect on any other portion of recorder 1, so recorder 1 functions normally for its rightful owner.

In the event that recorder 1 breaks down and its owner wishes to obtain another one, it will be necessary to retrieve internal key 204 from his old unit in order to program it into one-time programmable ROM 203 of his new unit, so that he will be able to play back copies that he had recorded using his old unit. A service facility programs bit OTP10 of the old recorder 1 to a value of 1, which conditions OR gate 606 to enable AND gates 602A, permitting output of the key on lines 720 so that it can be programmed into one-time programmable ROM 203 of the new recorder 1. However, under the present invention the ON or 1 state of OTP10 irrevocably disables the normal operation of the recorder 1. The actual manner of doing this is a design choice; in the example given in FIG. 5, the disabling is accomplished by disabling the recording and playback paths of CPD 200. As shown in FIG. 2, encrypter 218 and decrypter 228 are integral to the recording and playback paths respectively. As shown in FIG. 5, bit OTP10 is required to be in the OFF or 0 state to enable encrypter 218 and decrypter 228; programming. If the bit OTP10 is changed to the 1 state in order retrieve the keys thus disables the operation of the recorder 1 is thus disabled. Since programming bit OTP10 to the 1 state is an irrevocable operation, operation of recorder 1 is permanently disabled. Many alternative ways may be contemplated in which the 1 state of bit OTP10 may be deployed to disable the recorder 1.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of recording digital data, comprising:
receiving packets of a digital data stream in a recording and playback device;
encrypting the received packets in the recording and playback device according to an encryption key unique to the recording and playback device, wherein the recording and playback device includes a readout path for at least a portion of the encryption key, the readout path being connectable to an external IC tester;
storing the encrypted packets;
arranging the readout path to be disabled by a first irrevocable condition and to be re-enabled by a second irrevocable condition, and
arranging a path essential to functioning of the recording and playback device to be disabled by said second irrevocable condition.

2. The method of claim 1, further comprising:
retrieving the encrypted packets;
decrypting the encrypted packets in the recording and playback device according to the encryption key unique to the recording and playback device; and
passing the decrypted packets to a presentation device;
whereby a copy of the encrypted packets will not play back intelligibly using other recording and playback devices,
whereby the encrypted packets are protected against unauthorized distribution.

3. The method of claim 1, wherein:
a first portion of said encryption key unique to a recording and playback device is hard-wired in said recording and playback device;
a second portion of said encryption key unique to said recording and playback device is stored in a memory associated with said recording and playback device;
said encryption key is formed in said recording and playback device according to a predetermined algorithm from said first portion and said second portion.

4. The method of claim 1, wherein:
a first portion of said encryption key unique to a recording and playback device is hard-wired in said recording and playback device;
a plurality of second portions of said encryption key unique to said recording and playback device are stored in a memory associated with said recording and playback device;
said encryption key is formed in said recording and playback device according to a predetermined algorithm from said first portion and one certain second portion from said plurality of second portions.

5. The method of claim 1, wherein:
a first portion of said encryption key unique to a recording and playback device is hard-wired in said recording and playback device;
a second portion of said encryption key unique to said recording and playback device is stored in a memory associated with said recording and playback device;
a third portion of said encryption key is entered by a user of the recording and playback device; and
said encryption key unique to said recording device is formed in said recording and playback device according to a predetermined algorithm from said first portion, said second portion, and said third portion, whereby another user of said recording and playback device who does not know said third portion is precluded from obtaining intelligible playback of a recorded data stream.

6. The method of claim 1, wherein:
a packet comprises a first predetermined number of header bytes and a second predetermined number of payload bytes;
the header bytes are stored unencrypted; and
the payload bytes are stored encrypted,
whereby operations performable on the data stream that require access to header bytes but not to payload bytes are performable on the stored encrypted packets of the data stream.

7. The method of claim 6, wherein stored packets are retrieved, header bytes are not decrypted, and payload bytes are decrypted.

8. The method of claim 6, wherein stored packets are retrieved, header bytes are replaced, and payload bytes are decrypted.

9. A method of recording digital data, comprising:
receiving packets of a digital data stream in a recording and playback device;
encrypting the received packets in the recording and playback device according to an encryption key unique to the recording and playback device;
storing the encrypted packets, wherein
a packet comprises a first predetermined number of header bytes and a second predetermined number of payload bytes;
the header bytes are stored unencrypted; and
the payload bytes are stored encrypted,
whereby operations performable on the data stream that require access to header bytes but not to payload bytes are performable on the stored encrypted packets of the data stream, wherein
stored packets are retrieved, header bytes are replaced, and payload bytes are decrypted;
the recording and playback device includes a random-access memory having a plurality of byte locations each corresponding to a different one of a plurality of first memory addresses;
bytes constituting a packet of the decrypted data stream appear sequentially at the output of a FIFO memory;
the output of the FIFO memory is mapped to a number of second memory addresses at least equal to the number of bytes comprising a packet;
the second memory addresses are contiguous with the first memory addresses;
the replacement header bytes are loaded into the n highest locations of the random-access memory, where n is the first predetermined number;
readout of the packet is accomplished by reading a number of the memory addresses equal to the sum of the first and second predetermined numbers commencing from the random-access memory address where the replacement header bytes commence.

10. The method of claim 9, wherein the recording and playback device includes a readout path for at least a portion of the encryption key, the readout path being connectable to an external IC tester, the method further comprising:
arranging the readout path to be disabled by a first irrevocable condition and to be re-enabled by a second irrevocable condition, and arranging a path essential to functioning of the recording and playback device to be disabled by said second irrevocable condition.

11. The method of claim 1, comprising providing in the recording and playback device a one-time-programmable ROM, and wherein said first irrevocable condition comprises programming ON a first certain bit of the one-time programmable ROM, and wherein said second irrevocable condition comprises programming ON a second certain bit of the one-time programmable ROM.

12. The method of claim 11, further comprising storing said key portion bits in the one-time programmable ROM.

13. Apparatus for recording and playing back digital data, comprising:
a data receiver for receiving packets of a digital data stream;
an encrypter for encrypting the received packets according to an encryption key unique to the apparatus;
a data store for storing the encrypted packets; and
a readout path for retrieving at least a portion of the encryption key and arranged to be disabled by a first irrevocable condition and to be re-enabled by a second irrevocable condition, said readout path being connectable to an external IC tester and wherein recording and playback functioning of the apparatus is disabled by said second irrevocable condition.

14. The apparatus of claim 13, further comprising:
a decrypter for retrieving and decrypting the encrypted packets according to the encryption key unique to the apparatus; and
a data transmitter for passing the decrypted packets to a presentation device;
whereby a copy of the encrypted packets will not play back intelligibly using a different apparatus,
whereby the encrypted packets are protected against unauthorized distribution.

15. The apparatus of claim 13, further comprising:
permanent storage for storing a first portion of said encryption key unique to the apparatus;
a memory for storing a second portion of said encryption key unique to said apparatus;
key logic for forming said encryption key according to a predetermined algorithm from said first portion and said second portion.

16. The apparatus of claim 13, further comprising:
permanent storage for storing a first portion of said encryption key unique to the apparatus;
a memory for storing a plurality of second portions of said encryption key unique to said apparatus;
key logic for forming said encryption key to a predetermined algorithm from said first portion and one certain second portion from said plurality of second portions.

17. The apparatus of claim 13, further comprising:
permanent storage for storing a first portion of said encryption key unique to the apparatus;
a memory for storing a second portion of said encryption key unique to said apparatus;
a user interface for receiving a third portion of said encryption key; and
key logic for forming said encryption key unique to said recording device according to a predetermined algorithm from said first portion, said second portion, and said third portion,
whereby another user of said apparatus who does not know said third portion is precluded from obtaining intelligible playback of a recorded data stream.

18. The apparatus of claim 13, wherein:
a packet comprises a first predetermined number of header bytes and a second predetermined number of payload bytes;
the data store stores the header bytes unencrypted; and
the data store stores the payload bytes encrypted,
whereby operations performable on the data stream that require access to header bytes but not to payload bytes are performable on the recorded data stream.

19. The apparatus of claim 18, wherein stored packets are retrieved from the data store, header bytes are not decrypted, and payload bytes are decrypted by the decrypter.

20. The apparatus of claim 18, wherein stored packets are retrieved from the data store, control logic replaces header bytes, and payload bytes are decrypted.

21. Apparatus for recording and playing back digital data, comprising:
a data receiver for receiving packets of a digital data stream;
an encrypter for encrypting the received packets according to an encryption key unique to the apparatus;
a data store for storing the encrypted packets, wherein a packet comprises a first predetermined number of header bytes and a second predetermined number of payload bytes, the data store stores the header bytes unencrypted, and the data store stores the payload bytes encrypted, whereby operations performable on the data stream that require access to header bytes but not to payload bytes are performable on the recorded data stream,
wherein stored packets are retrieved from the data store, control logic replaces header bytes, and payload bytes are decrypted,
a random-access memory having a plurality of byte locations each corresponding to a different one of a plurality of first memory addresses; and
a FIFO memory sequentially outputting bytes constituting a packet of the decrypted data stream, wherein:
the output of the FIFO memory is mapped to a number of second memory addresses at least equal to the number of bytes comprising a packet; and
the second memory addresses are contiguous with the first memory addresses, and wherein:
the control logic loads replacement header bytes into the n highest locations of the random-access memory, where n is the first predetermined number; and
the control logic reads out the packet by reading a number of the memory addresses equal to the sum of the first and second predetermined numbers commencing from the random-access memory address where the replacement header bytes commence.

22. The apparatus of claim 21, comprising a readout path for retrieving at least a portion of the encryption key and arranged to be disabled by a first irrevocable condition and to be re-enabled by a second irrevocable condition, said readout path being connectable to an external IC tester and wherein recording and playback functioning of the apparatus is disabled by said second irrevocable condition.

23. The apparatus of claim 13, comprising a one-time-programmable ROM, and wherein said first irrevocable condition comprises programming ON a first certain bit of the one-time programmable ROM, and wherein said second irrevocable condition comprises programming ON a second certain bit of the one-time programmable ROM.

24. The apparatus of claim 23, wherein said key portion is stored as bits in the one-time programmable ROM.

25. A recorder for recording digital data streams, comprising:

hardware dimensioned and arranged for encrypting packets of a digital data stream according to a binary key at least a portion of which is stored in said hardware of the recorder;

a readout path for retrieving said key portion stored in said hardware of the recorder, said readout path arranged to be disabled by a first irrevocable condition and re-enabled by a second irrevocable condition, said readout path being connectable to an external IC tester; and at least one feature essential for recording and playback functioning of the recorder arranged to be disabled by said second irrevocable condition.

26. The recorder of claim 25, comprising a one-time-programmable ROM, and wherein said first irrevocable condition comprises programming ON a first certain bit of the one-time programmable ROM, and wherein said second irrevocable condition comprises programming ON a second certain bit of the one-time programmable ROM.

27. The recorder of claim 26, wherein said key portion comprises bits stored in the one-time programmable ROM.

28. A method practiced in a recorder for recording digital data streams, comprising the steps of:

encrypting, according to a binary key at least a portion of which is stored in hardware of the recorder, packets of a digital data stream, the recorder including a readout path for retrieving said key portion, the readout path being connectable to an external IC tester;

arranging said readout path to be disabled by a first irrevocable condition and re-enabled by a second irrevocable condition; and arranging at least one feature essential for recording and playback functioning of the recorder to be disabled by said second irrevocable condition.

29. The method of claim 28, comprising providing in the recorder a one-time-programmable ROM, and wherein said first irrevocable condition comprises programming ON a first certain bit of the one-time programmable ROM, and wherein said second irrevocable condition comprises programming ON a second certain bit of the one-time programmable ROM.

30. The method of claim 29 further comprising storing said key portion bits in the one-time programmable ROM.

31. A set-top box for recording and playing back digital data, consisting of a housing which comprises:

a data receiver for receiving packets of a digital data stream;

an encrypter for encrypting the received packets according to an encryption key unique to the set-top box;

a data store for storing the encrypted packets; and a readout path for retrieving at least a portion of the encryption key and arranged to be disabled by a first irrevocable condition and to be re-enabled by a second irrevocable condition said readout path being connectable to an external IC tester and wherein recording and playback functioning of the apparatus is disabled by said second irrevocable condition.

32. The set-top box of claim 31, wherein the housing further comprises:

a decrypter for retrieving and decrypting the encrypted packets according to the encryption key unique to the set-top box; and a data transmitter for passing the decrypted packets to a presentation device;

whereby a copy of the encrypted packets will not play back intelligibly using another set-top box, whereby the encrypted packets are protected against unauthorized distribution.

33. The set-top box of claim 31, wherein the housing further comprises:

permanent storage for storing a first portion of said encryption key unique to the set-top box;

a memory for storing a second portion of said encryption key unique to said set-top box;

key logic for forming said encryption key according to a predetermined algorithm from said first portion and said second portion.

34. The set-top box of claim 31, wherein the housing further comprises:

permanent storage for storing a first portion of said encryption key unique to the set-top box;

a memory device for storing a plurality of second portions of said encryption key unique to said set-top box;

key logic for forming said encryption key to a predetermined algorithm from said first portion and one certain second portion from said plurality of second portions.

* * * * *